(12) United States Patent
Richardson et al.

(10) Patent No.: US 6,614,975 B2
(45) Date of Patent: Sep. 2, 2003

(54) OPTICAL FIBER AND OPTICAL FIBER DEVICE

(75) Inventors: David John Richardson, Southampton (GB); Neil Gregory Raphael Broderick, Southampton (GB); Herman Leonard Offerhaus, Southampton (GB); Liang Dong, Montreal (CA); Rowland Sammut, Weetangera (AU)

(73) Assignee: University of Southampton, Hampshire (GB)

( * ) Notice: Subject to any disclaimer, the term of this patent is extended or adjusted under 35 U.S.C. 154(b) by 182 days.

(21) Appl. No.: 09/753,489

(22) Filed: Jan. 3, 2001

(65) Prior Publication Data

US 2002/0018630 A1 Feb. 14, 2002

Related U.S. Application Data

(63) Continuation of application No. PCT/GB99/02136, filed on Jul. 5, 1999.

(30) Foreign Application Priority Data

Jul. 3, 1998 (GB) .............................................. 9814526

(51) Int. Cl.$^7$ ................................................. G02B 6/02
(52) U.S. Cl. ...................................................... 385/127
(58) Field of Search ................................. 385/123, 124, 385/125, 127

(56) References Cited

U.S. PATENT DOCUMENTS

| 4,436,368 A | | 3/1984 | Keck | |
|---|---|---|---|---|
| 4,691,990 A | | 9/1987 | Cohen et al. | |
| 4,715,679 A | * | 12/1987 | Bhagavatula | ............... 385/127 |
| 5,121,460 A | | 6/1992 | Tumminelli et al. | |
| 5,432,806 A | * | 7/1995 | Snitzer | ............... 372/6 |
| 5,555,340 A | * | 9/1996 | Onishi et al. | ................ 385/127 |

(List continued on next page.)

FOREIGN PATENT DOCUMENTS

| EP | 0 041 864 A2 | 12/1981 |
|---|---|---|
| EP | 0 131 634 A1 | 1/1985 |
| EP | 0 260 795 A2 | 7/1987 |
| EP | 0 368 014 A1 | 10/1989 |
| EP | 0 414 369 A2 | 2/1991 |
| EP | 0 469 795 A | 2/1992 |
| EP | 0 721 119 A1 | 7/1996 |
| EP | 0 724 171 A2 | 7/1996 |
| EP | 0 789 257 A1 | 8/1997 |
| EP | 0 851 544 A1 | 7/1998 |
| GB | 2 105 488 A | 3/1983 |
| GB | 2 116 744 A | 9/1983 |
| WO | 86/04689 | 8/1986 |

OTHER PUBLICATIONS

D. J. Richardson et al., "Fiber Laser Systems Shine Brightly", Laser Focus World, Sep. 1997, pp. 87–96.
R. J. Mears et al., "Low–Threshold Tunable CW and Q–Switched Fibre Laser Operating at 1–55 μm", Electronic Letters, vol. 22, No. 3, Jan. 30, 1986, pp. 159–160.

(List continued on next page.)

*Primary Examiner*—Lynn Feild
*Assistant Examiner*—Thanh-Tam Le
(74) *Attorney, Agent, or Firm*—Renner, Otto, Boisselle & Sklar, LLP

(57) ABSTRACT

An optical fibre has a cladding layer surrounding a core, the cladding layer comprising at least a first, relatively inner generally cylindrical region, a third, relatively outer generally cylindrical region, and a second region disposed between the first and third regions, the second region having a higher refractive index than the first and third regions; and the peak difference in refractive index between the first cladding region and the core being less than about 0.0030.

36 Claims, 10 Drawing Sheets

U.S. PATENT DOCUMENTS

| | | | | |
|---|---|---|---|---|
| 5,659,649 | A | | 8/1997 | Nouchi et al. |
| 5,675,690 | A | | 10/1997 | Nouchi et al. |
| 5,719,973 | A | * | 2/1998 | Monroe et al. ............... 385/34 |
| 5,963,700 | A | * | 10/1999 | Kato et al. .................. 385/127 |
| 5,966,491 | A | * | 10/1999 | DiGiovanni ................ 385/127 |
| 6,118,575 | A | * | 9/2000 | Grubb et al. ............... 359/337 |
| 6,321,016 | B1 | * | 11/2001 | Tirloni et al. ............... 385/127 |
| 6,327,403 | B1 | * | 12/2001 | Danziger et al. ............. 385/29 |
| 6,411,762 | B1 | * | 6/2002 | Anthon et al. .............. 385/123 |

OTHER PUBLICATIONS

F. Sequin et al., "Diode–pumped Q–Switched Fiber Laser", Optical Engineering, vol. 32, No. 9, Sep. 1993, pp. 2036–2041.

A. Chandonnet et al., "High–Power Q–Switched Erbium Fiber Laser Using an All–Fiber Intensity Modulator", Optical Engineering, vol. 32, No. 9, Sep. 1993, pp. 2031–2035.

G. P. Lees et al., "980nm Diode Pumped Erbium$^{3+}$/Ytterium$^{3+}$ Doped Q–Switched Fibre Laser", Electronics Letters, vol. 31, No. 21, Oct. 12, 1995, pp. 1836–1837.

J. Nilsson et al., "Modeling and Optimization of Low–Repetition–Rate High–Energy Pulse Amplification in CW–Pumped Erbium–Doped Fiber Amplifiers", Optics Letters, vol. 18, No. 24, Dec. 15, 1993, pp. 2099–2101.

D. Taverner et al., "158–$\mu$J Pulses From a Single–Transverse–Mode, Large–Mode–Area Erbium–Doped Fiber Amplifier", Optics Letters, vol. 22, No. 6, Mar. 15, 1997, pp. 378–380.

G. P. Lees et al., "Q–Switched Erbium Doped Fibre Laser Utilising a Novel Large Mode Area Fibre", Electronic Letters, vol. 33, No. 5, Feb. 27, 1997, pp. 393–394.

R. Olshansky, "Distortion Losses in Cabled Optical Fibers", Applied Optics, vol. 14, No. 1, Jan. 1975, pp. 20–21.

M. E. Fermann, "Single–Mode Excitation of Multimode Fibers With Ultrashort Pulses", Optics Letters, vol. 23, No. 1, Jan. 1, 1998, pp. 52–54.

P. E. Britton et al., "Optical Parametric Oscillation in Periodically Poled Lithium Niobate Driven By a Diode–Pumped Q–Switched Erbium Fiber Laser", Optics Letters, vol. 23, No. 8, Apr. 15, 1998, pp. 582–584.

D. J. Richardson et al., "Diode–Pumped, High–Energy, Single Transverse Mode Q–Switch Fiber Laser", Electronic Letters, vol. 33, No. 23, pp. 1955–1956. No date.

H. Sabert et al., "Pulse Generation in Fiber Lasers With Frequency Shifted Feedback", Journal of Lightwave Technology, vol. 12, No. 8, Aug. 1994, pp. 1360–1368.

M. Romagnoli et al., "Tunable Erbium–Ytterbium Fiber Sliding–Frequency Soliton Laser", J. Opt. Soc. AM. B., vol. 12, No. 1, Jan. 1995, pp. 72–76.

K. Tamura et al., "Technique for Obtaining High–Energy Ultrashort Pulses from an Additive–Pulse Mode–Locked Erbium–Doped Fiber Ring Laser", Optics Letters, vol. 19, No. 1, Jan. 1, 1994, pp. 46–48.

V. Cautaerts et al., "Stretched Pulse YB$^{3+}$:Silica Fiber Laser", Optics Letters, vol. 22, No. 5, Mar. 1, 1997, pp. 316–318.

P. V. Mamyshev et al., "Stability of soliton Propagation With Sliding–Frequency Guiding Filters", Optics Letters, vol. 19, No. 24, Dec. 15, 1994, pp. 2083–2085.

W. A. Clarkson et al., "Two–Mirror Beam–Shaping Technique For High–Power Diode Bars", Optics Letters, vol. 21, No. 6, Mar. 15, 1996, pp. 375–377.

H. L. Offerhaus et al., "High–Energy Single–Transverse––Mode Q–Switched Fiber Laser Based On A Multimode Large–Mode–Area Erbium–Doped Fiber", Optics Letters, vol. 23, No. 21, Nov. 1, 2998, pp. 1683–1685.

R. Paschotta et al., "Ytterbium–Doped Fiber Amplifiers", Journal of Quantum Electronics, vol. 33, No. 7, Jul. 1997, pp. 1049–1056.

J. Nilsson et al., "Long–Wavelength Erbium–Doped Fiber Amplifier Gain Enhanced by Ase End–Reflectors", IEEE Photonics Technology Letters, vol. 10, No. 11, Nov. 1998, pp. 1551–1553.

J.D. Minelly et al., "Efficient Cladding Pumping of an Er$^{3+}$ Fibre", Proc. of 21st European Conference on Optical Communication, (Brussels, 1995), pp. 917–920. No month.

Broderick N. G. R. et al., "Power Scaling in Passively Mode–Locked Large–Mode Area Fiber Lasers", IEEE Photonics Technology Letters, vol. 10, No. 12, Dec. 1998, pp. 1718–1720, XP000802165.

Offerhaus H. L. et al., "High–Energy Single–Transverse–Mode Q–Switched Fiber Laser Based on a Multimode Large–Mode–Area Erbium–Doped Fiber" Optics Letters, vol. 23, No. 21, Nov. 1, 1998, pp. 1683–1685, XP000786759 ISSN: 0146–9592.

* cited by examiner

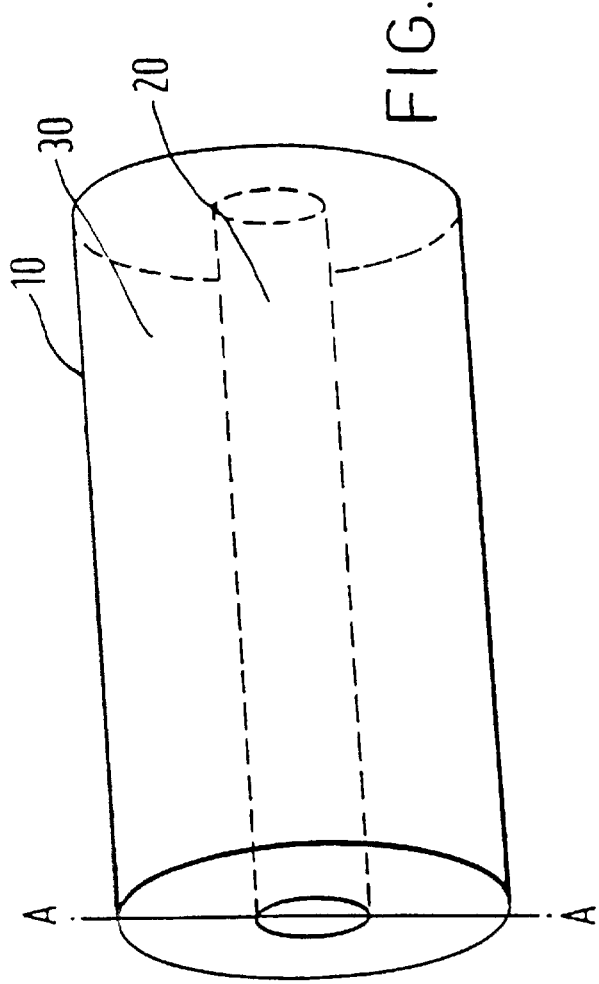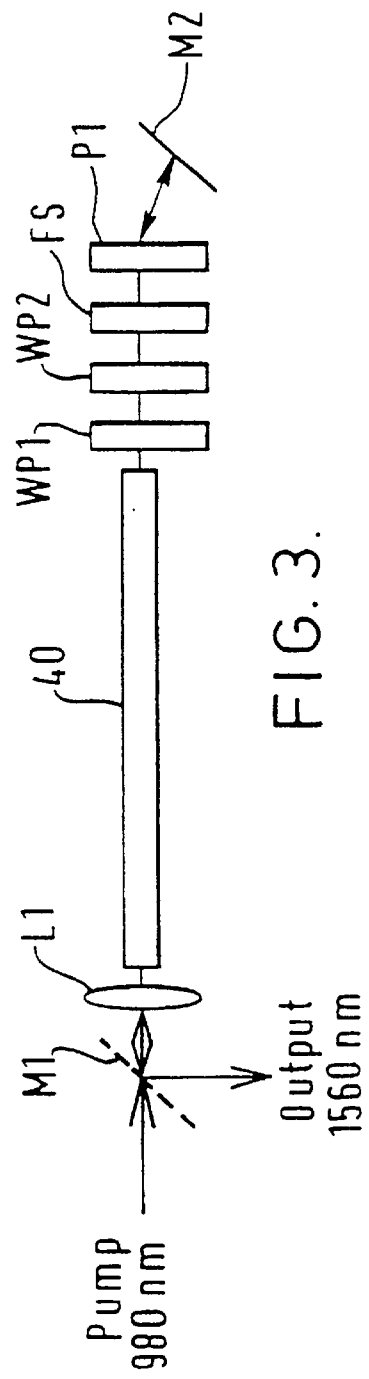

OPTICAL FIBER AND OPTICAL FIBER DEVICE

This is a continuation of PCT/GB49/02136 filed Jul. 5, 1999.

This invention relates to optical fibres and optical fibre devices such as, for example, optical fibre lasers.

Optical fibre lasers for continuous-wave (cw) or pulsed operation make use of amplifying optical fibres arranged with reflectors to form a laser cavity. For example, publication reference [1] describes a single mode Q-switched optical fibre laser system employing a low numerical aperture erbium-doped single mode fibre pumped by a diode laser to give 160 µJ, 50 nS pulses tunable between 1530 and 1560 nm.

Previously, much of the work done on erbium-doped fibres has concentrated on maximising the small signal optical gain, which in turn requires a small "spot size" or mode-field diameter (MFD). This also provides single mode operation considered desirable in applications requiring a high beam quality, communication applications and applications requiring very short pulses—see [1].

However, a problem which has been noted in such doped fibre devices is that nonlinearity within the core can distort the optical output at high powers, resulting in limits placed on the peak power of pulses which can be accommodated in the fibre before nonlinear distortions such as self phase modulation become apparent. In one example, the maximum tolerable peak power in 1 m of a previous doped optical fibre is about 500 W.

Similar problems can also occur in cw lasers and amplifiers where nonlinear effects such as Brillouin scattering can limit the output power when operating with narrow linewidths (e.g. <10 MHz). For 1 m of conventional fibre in cw operation the nonlinear threshold for Brillouin scattering is about 20 W.

A further restriction on the available output power from pulsed fibre lasers is the energy storage capacity of the amplifying fibre. The high gain efficiencies in conventional single mode fibres limit the energy that can be stored to about 10 µJ.

So, there exists a continuing need for larger and larger peak powers and pulse energies while retaining the possibility of single mode operation, but this is limited by nonlinear effects and low energy storage in conventional fibres.

This invention provides an optical fibre having a cladding layer surrounding a core, the cladding layer comprising at least a first, relatively inner generally cylindrical region, a third, relatively outer generally cylindrical region, and a second region disposed between the first and third regions, the second region having a higher refractive index than the first and third regions; and the peak difference in refractive index between the first cladding region and the core being less than about 0.0030.

A fibre according to the invention is capable of operating in a single transverse mode but with a much higher MFD than in conventional single mode fibres—in some prototypes up to 40 µm. In an amplifying or lasing application this can lead to non-linear effects being dramatically reduced and the energy storage capability of the fibres being dramatically increased, allowing single mode pulse energies in prototype devices of 0.5 mJ or, if a slightly multi mode signal is tolerated, up to 0.85 mJ. It is envisaged that the invention provides technology allowing pulse energies in the mJ regime.

In prototype fibres according to the invention, nonlinear thresholds are 20–25 times higher than in conventional fibres, so the power handling capability of the fibre is correspondingly increased.

As well as being appropriate for pulsed applications, fibres according to the invention can provide increased power in cw single frequency lasers, amplifiers and associated devices and can increase nonlinear thresholds within passive devices such as Bragg gratings.

The fibre design is also compatible with cladding pumping techniques (see [1]), so providing corresponding increases in average output power available from such devices.

The cladding refractive index structure defined above provides two main benefits.

Firstly, it gives an increased spot size for the fundamental guided mode. This reduces nonlinear effects by simply providing a larger cross-sectional area over which the light is propagated, so reducing the energy density within the core.

Secondly, it can decrease the fibre bend loss for the fundamental mode (an established problem). In prototype embodiments an improvement in bend loss of between 10 and 40 dB has been observed. For a prototype 21 µm core fibre the macroscopic bend loss for a 30 cm radius bend was found to be less than 0.1 dB/m.

A further feature arises from the small refractive index difference between the core and the cladding, which in turn means that the fibre has a very low numerical aperture (NA)—as low as about 0.06 in some prototype embodiments. The low NA ensures that there are few viable optical propagation modes even for a large core area, and so can alleviate the problem of coupling of energy (e.g. by amplified spontaneous emission or ASE) into unwanted modes. A preferred large outer diameter of the fibre (e.g. greater than about 200 µm) can also help to alleviate mode coupling.

The arrangement defined by the invention can be highly advantageous when implemented as a single mode fibre, because the low NA and novel cladding structure can spread the fundamental mode beyond the normal bounds of the core and out towards the preferred "ring" structure within the cladding. This increases the MFD of the fibre, increasing its energy storage capacity and decreasing nonlinear effects, because the energy density at any position is reduced. However, even greater benefits can be obtained in a multimode fibre, i.e. one capable of supporting more than just the fundamental mode (see Appendix one for an analytical derivation of the term "single-mode", although a working definition is widely accepted within the art). In such a case, the MFD can be increased still further, while the low NA acts to restrict the available modes of the structure. Furthermore, in an amplifier or laser configuration, if an amplifying dopant distribution is chosen (such as doping a central region of the core) which overlaps more favourably with one mode (e.g. the fundamental mode, but it could be another mode), the multimode fibre can operate effectively in a single mode. So, the double benefit can be obtained of a fibre having a relatively large "multimode" core—so that the power handling capacity of the fibre core is improved—operating in a single mode by the influence of the placement of the dopant.

The single mode operation amplifying applications, where the amplifying dopant is preferably substantially confined to the core, arises because the modal overlap of the fundamental mode with the symmetrically doped core is far higher than the modal overlap of any other (higher order) mode. This leads to a significant gain difference between the fundamental mode and other modes, in effect providing single mode operation with a fibre having a large enough core to support multimode operation. (In other embodiments another dopant distribution—perhaps an asymmetric one—could be used so as to favour a mode other than the fundamental).

This invention also provides an optical fibre amplifier comprising a doped fibre as defined above; and means for injecting pump radiation into the fibre.

This invention also provides an optical fibre laser comprising: an optical fibre amplifier as defined above; and reflector means disposed relative to the optical fibre amplifier so as to promote lasing operation within the optical fibre amplifier.

The invention will now be described by way of example with reference to the accompanying drawings, throughout which like parts are referred to by like references, and in which:

FIG. 1 schematically illustrates an optical fibre;

FIG. 2 schematically illustrates a refractive index profile of the optical fibre of FIG. 1, along with mode distributions within the fibre;

FIG. 3 schematically illustrates a laser cavity;

FIG. 4 schematically illustrates a pulse spectrum and auto-correlation function;

FIG. 5 schematically illustrates a pulse spectrum and auto-correlation function;

Figure 14:
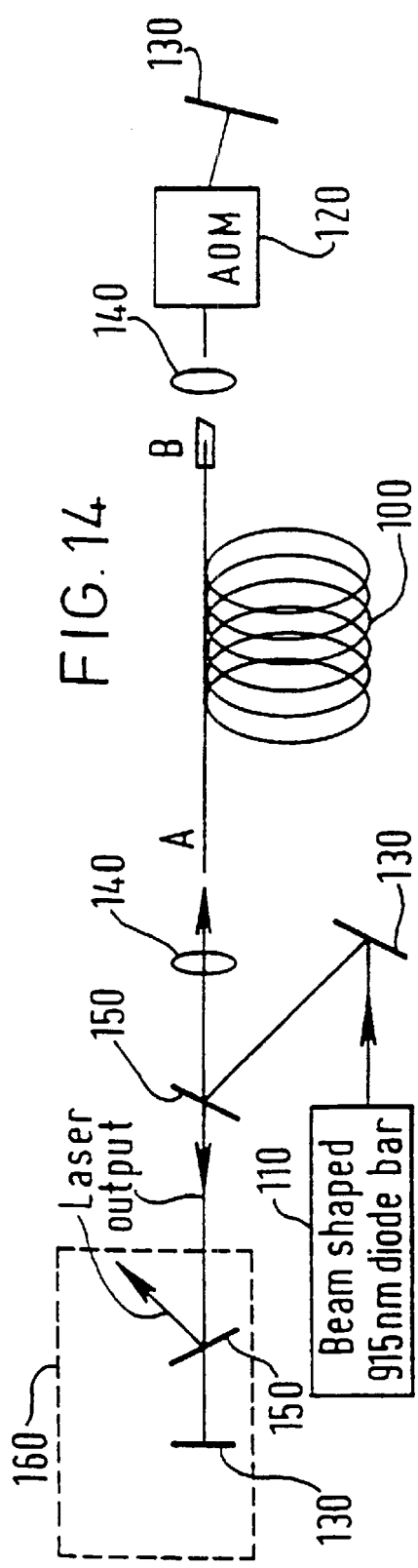
Figure 15:
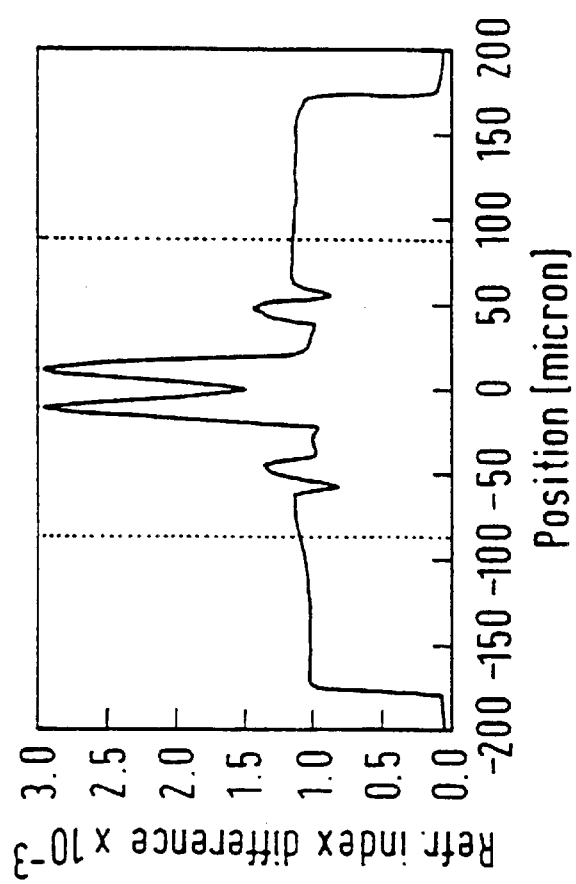
Figure 16:
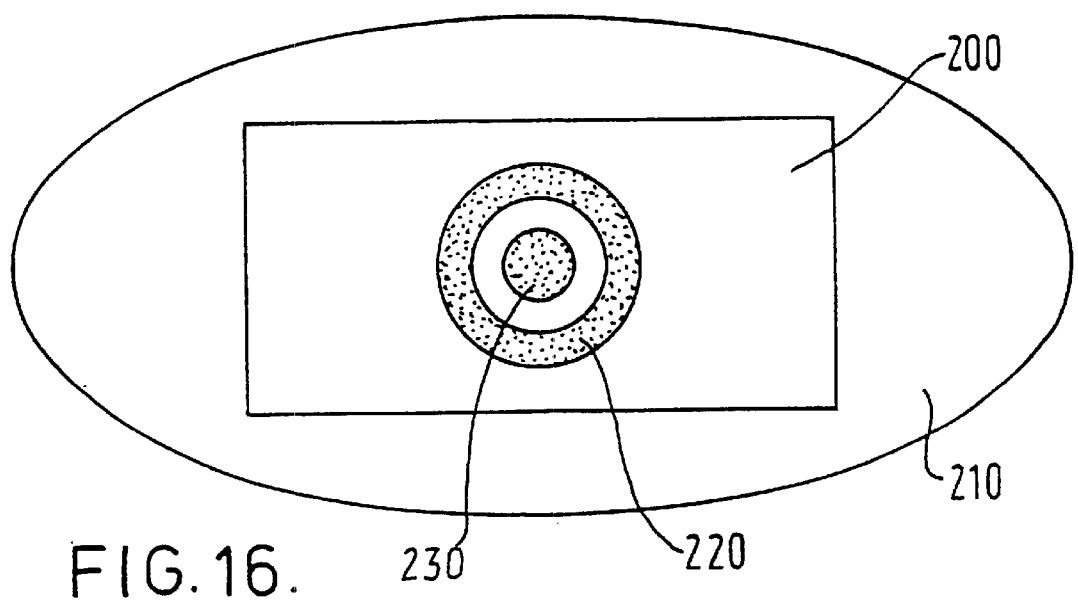
Figure 19:
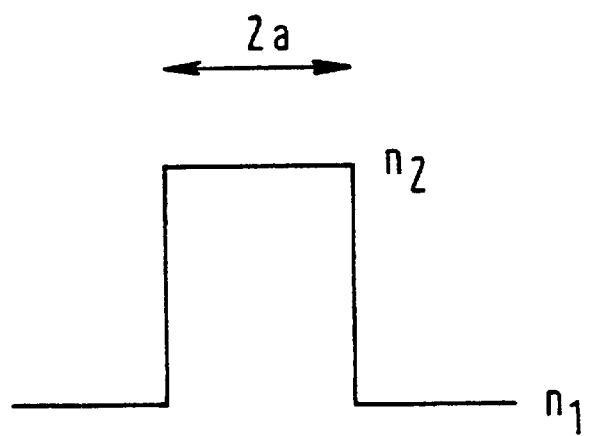
Figure 17:
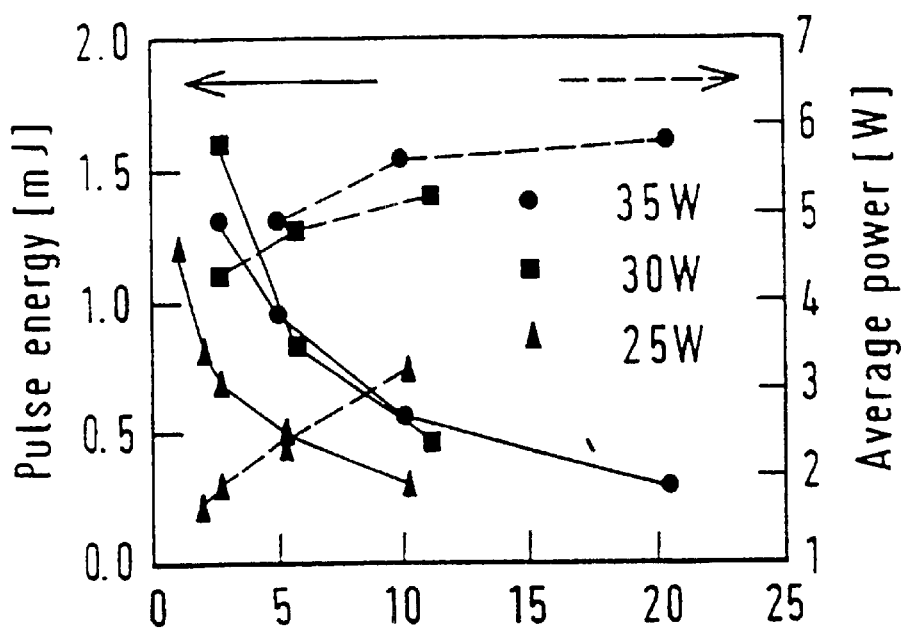
Figure 18:
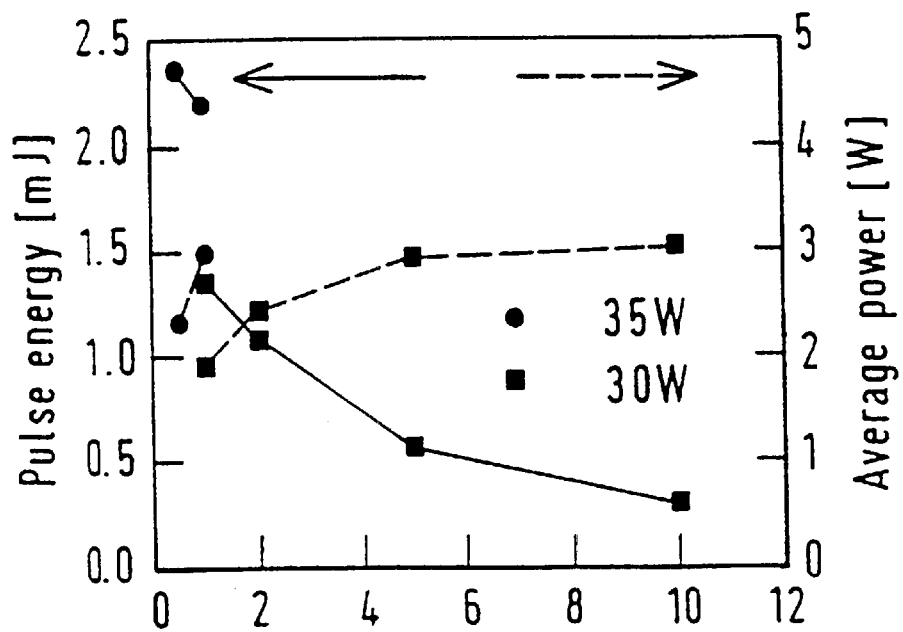

FIG. 14 schematically illustrates the experimental configuration of an example embodiment;

FIG. 15 schematically illustrates the core refractive index profile of a fibre used in the embodiment of FIG. 14;

FIG. 16 schematically illustrates a cross-section of an encapsulated fibre;

FIG. 17 is a graph of pulse energy and average power as a function of repetition frequency for several incident powers, without ASE feedback;

FIG. 18 is a graph of pulse energy and average power as a function of repetition frequency for several incident powers, with ASE feedback; and FIG. 19 is a schematic index profile of a hypothetical fibre for the purposes of the derivation outlined in the Appendix.

Figure 2:
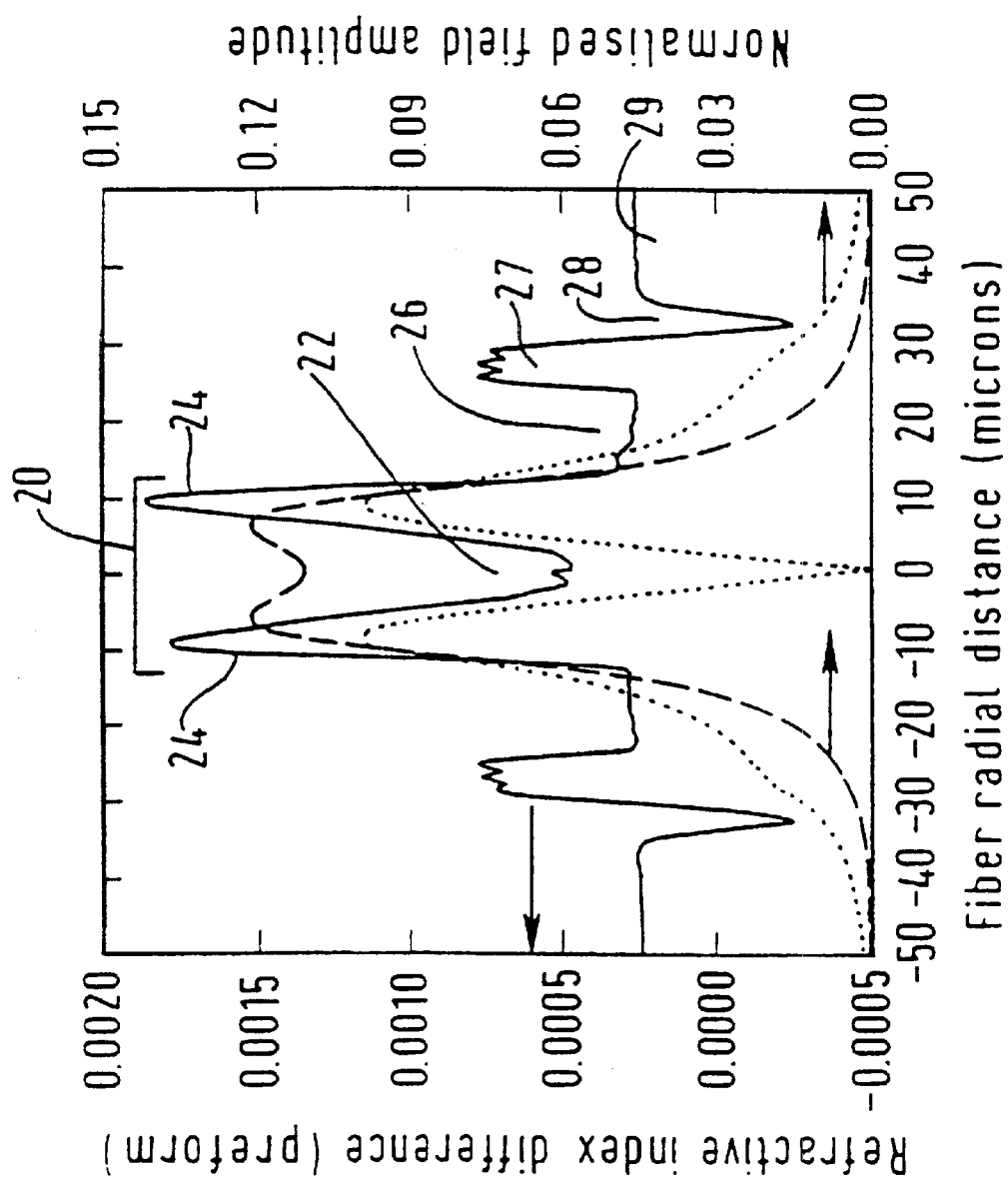

Referring now to FIG. 1, an optical fibre 10 comprises a glass core 20 surrounded by a glass cladding 30. A line A—A indicates an axis through the centre of the fibre along which the refractive index is illustrated in FIG. 2. (In FIG. 2 it is assumed that the refractive index of the fibre is circularly symmetric around the longitudinal axis of the fibre, so the regions of the fibre to be described are generally cylindrical).

The measured refractive index profile along the line A—A for a prototype fibre is shown in FIG. 2 (solid line). The fibre core 20 consists of a low numerical aperture (NA) central region 22 and a slightly raised outer ring 24. The inner region is doped with 400 ppm (parts per million) of erbium while the outer ring is undoped. In the cladding of the fibre, a relatively inner cladding section 26 is adjacent to the core. There is then a region 27 of raised refractive index followed (in a radial direction) by a region 28 of depressed refractive index. Finally, the relatively outer cladding region 29 has a similar refractive index to that of the relatively inner region 26.

Other suitable dopants include rare earths such as ytterbium, thulium, neodymium, holmium or any combination of dopants with or without erbium. Of course, other amplifying dopants or combinations thereof, including other rare earths, can of course be used.

The region 28 of depressed refractive index is an artefact of the fibre manufacture process and is not considered important or contributory to the beneficial effects of the structure as described.

Because of the rotational symmetry of the fibre, the regions 26, 27, 28 and 29 are all substantially cylindrical.

The fibre is formed by pulling down a preform to an outer diameter of 235 $\mu$m (micrometers) giving a doped core diameter of 21 $\mu$m. For these parameters the fibre was predicted to support five guided modes at a wavelength of 1560 nm (nanometers) of which the first two are shown schematically as dotted and dashed lines in FIG. 2.

The other three modes supported by a fibre having a core of this size are weakly guided so-called "ring" modes, in that they are concentrated in the raised refractive index "ring" of the cladding (the region 27) and suffer excessive bend losses rendering them negligible from a practical perspective.

The purpose of the ring 27 is twofold. Firstly theoretical modelling of the profile shows that it helps to reduce the bending loss for the lowest order mode by as much as 40 dB. Secondly it increases the spot size by as much as 25% depending on the core radius. From FIG. 2 it can be seen that only the fundamental mode has a significant overlap with the doped central region. In addition the large outer diameter reduces the coupling between the fundamental mode and the 2nd order mode ensuring that the fibre is essentially single moded when used in a lasing application.

Some preferred ranges of dimensions for use in fabricating the fibre of FIG. 2 are as follows:

radial width of the cladding "ring" 27: between about 0.1 and about 3 times the core radius; preferably between about 0.5 and about 1.5 times the core radius; more preferably between about 0.75 and about 1,25 times the core radius; still more preferably between about 0.75 and about 1 times the core radius.

refractive index difference of the cladding ring 27 (i.e. the difference between the region 27 and the region 26, as a multiple of the peak difference between the region 26 and the core): between about 0.1 and about 2; preferably between about 0.2 and about 1; more preferably between about 0.4 and about 0.6.

width of inner cladding region 26: between about 0.1 and about 2 times the core radius; preferably between about 0.25 and about 1.5 times the core radius; more preferably between about 0.75 and about 1.25 times the core radius.

refractive index "dip" 22 in centre of the core: this preferably occurs over about half of the core's radius, and preferably the lowest refractive index difference between the core and the cladding region 26 should be (as a proportion of the peak refractive index difference between the core and the cladding region 26) between about 0 and about 0.95; preferably between about 0.25 and about 0.75; more preferably about 0.5.

peak refractive index difference between the core and the cladding region 26: preferably less than about 0.0030: more preferably less than about 0.0025; more preferably less than about 0.0020; still more preferably less than about 0.0015.

core diameter: preferably greater than about 20 $\mu$m.

operating waveband of the fibre: any appropriate fibre wavelengths, but in general terms about 1550 nm—e.g. the Er/Yb operating band, or say between about 1530 and 1560 nm.

The refractive index of the inner cladding region 26 can be made lower than that of the outer cladding region 29, thus giving an improved MFD or spot size at the expense of increased bend loss.

FIG. 3 schematically illustrates a laser cavity formed using the fibre of FIGS. 1 and 2. Pump light at 980 nm is supplied from a pump source (not shown) such as a 2.5 W Ti:Sapphire laser with a launch efficiency of ≈70%. The pump light enters through a dichroic mirror M1 into a laser cavity defined by the end reflection of the fibre and a high reflectance mirror M2. In the cavity are a lens L1, a length 40 of doped optical fibre of the type described above, a $\lambda/2$ waveplate WP1, a $\lambda/4$ waveplate WP2, an acousto-optic frequency shifter (acousto-optic Bragg cell modulator) FS operating at a frequency of 110 MHz and a polariser P1.

In an alternative embodiment, cladding pumping techniques can be used.

In operation, the high reflectance mirror M2 reflects the first order deflected beam from the acousto-optic frequency shifter. This beam in fact contains light shifted in frequency by 110 MHz, so the effect is that light is downshifted by 110 MHz per roundtrip along the cavity.

At the output end (the left-hand end as drawn), about 4% of the light is coupled back into the cavity (resulting from the Fresnel reflection off the cleaved end of the fibre) while the dichroic mirror M1 is used to separate the 1560 nm radiation from the incoming pump beam.

The presence of the frequency shifter in the cavity ensures that any CW radiation is eventually shifted outside the erbium gain bandwidth of the cavity and decays away. In contrast, high intensity pulses nonlinearly generate new frequencies during each round trip, so ensuring that the central frequency of the pulses remains within the gain bandwidth of the medium allowing stable operation. This form of mode-locking is well known and is quite similar to the idea of "sliding guiding filters" common in soliton transmission lines.

Once modelocked the repetition rate of the prototype device was 10.5 MHz for a fibre length 40 of 14 meters. The polarisation optics in the cavity are not necessary for mode-locking but instead act to shorten the mode-locked pulses through nonlinear polarisation evolution. This cavity design can also be used in a q-switching mode, the main difference between mode-locking and q-switching being that for q-switching the frequency shifter FS is switched periodically while for the mode-locked case it is on continuously.

As is common to frequency shifting lasers the prototype device operated in a number of output modes. If the laser was not mode-locked but instead running CW it had a maximum output of 512 mW with an incident pump power of 2.4 W. The quantum efficiency of the laser is approximately 75%.

At high incident powers the laser would usually self-start mode-locking although at lower powers it sometimes benefitted from some perturbation (typically it was found that tapping the optical bench would assist it to start). Upon mode-locking neither the average power nor the mode-profile changed significantly. At the powers required for self-starting the laser was unstable with multiple pulses in the cavity and to obtain stable output the pump power was reduced until there was only a single pulse in the cavity.

When mode-locked the output pulse shape was found to be either a long square pulse with a width between 20–30 ps or a much shorter "sech" shaped pulse.

Figure 4:
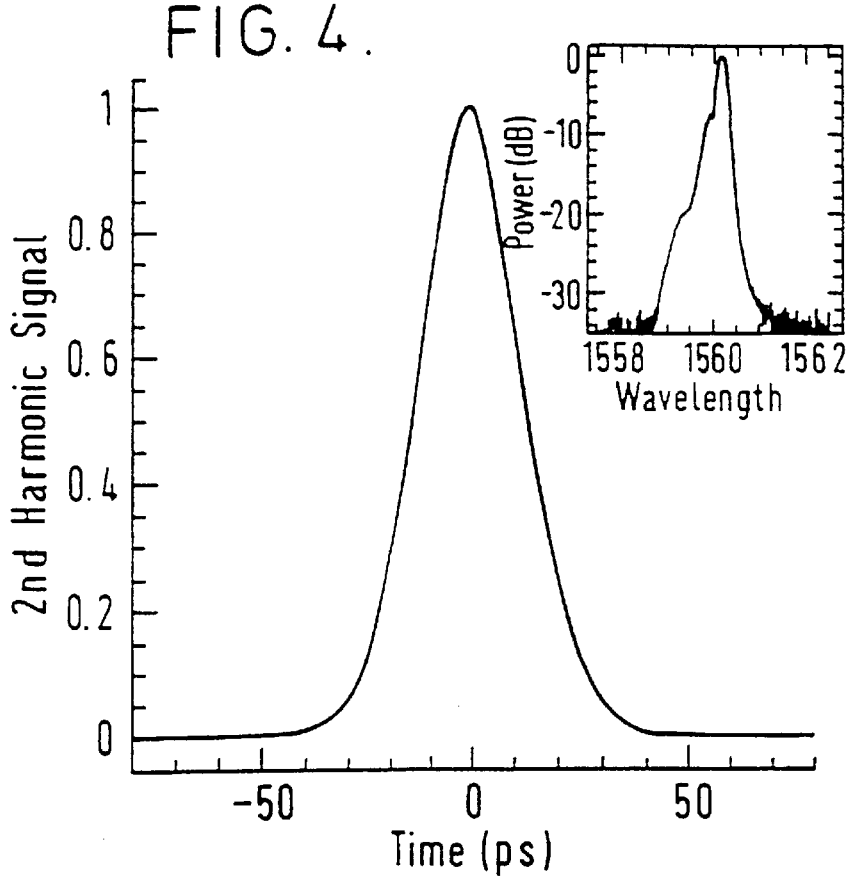

A typical auto-correlation and spectrum of a "long" pulse is shown in FIG. 4. The pulses are 20 ps long with a spectral width of 0.12 nm and a pulse energy of 20 nJ. These relatively long pulses were obtained without the polarisation optics (WP1, WP2, P1) in the cavity. Such long square pulses are to be expected in frequency shifted lasers. The pulse energy is considered to be a record at the priority date of this application, or at least very high, for passively mode-locked fibre lasers.

The increase in energy is believed to be due to the larger mode area of the fibres and confirms the expected scaling between spot size and output energy.

Figure 5:
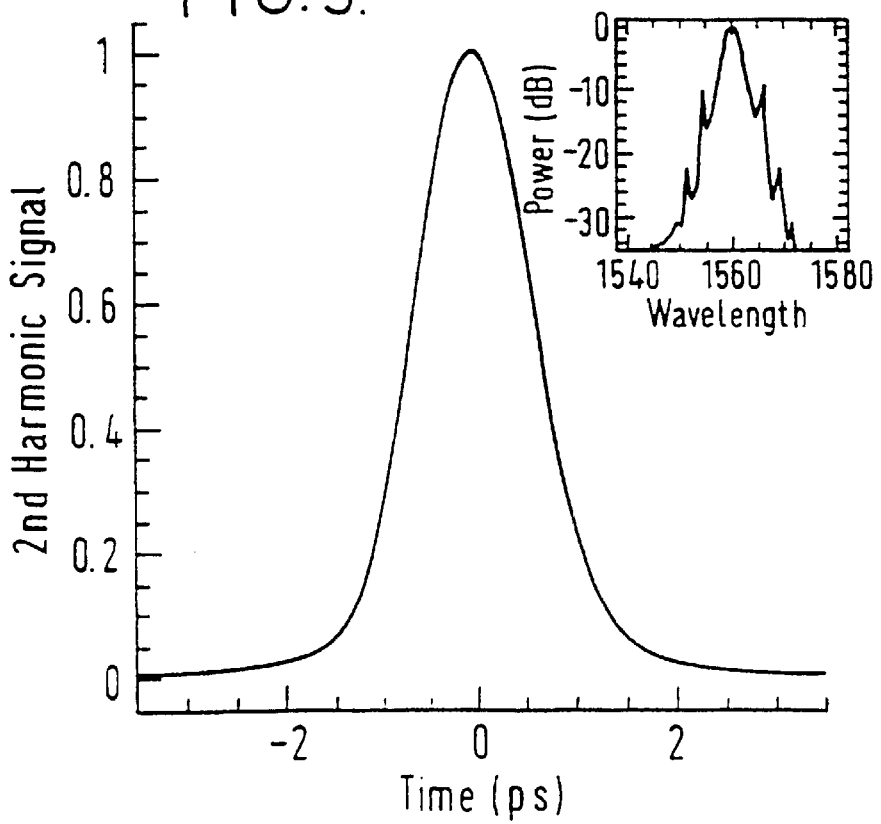

The second distinct mode-locking regime is shown in FIG. 5. Here the pulse width is 900 fs, although without polarisation control it broadens to 4 ps and is near transform-limited with a spectral width of 2.8 nm. The measured average pulse power is 16 mW giving a pulse energy of ~1.6 nJ and a peak power of 1.7 kW.

The pulse energy is comparable to that obtained from stretched pulse lasers. The sidelobes on the pulse's spectrum are common to these soliton lasers and from their spacing it is possible to estimate the fibre dispersion as ≈20 ps/(nm.km) which is approximately that of fused silica—as expected from the fibre design. From these pulse and fibre parameters the soliton order is estimated to be 1.24 at the laser output. For comparison the fundamental soliton energy in a conventional doped fibre with the same dispersion would be ≈20 pJ.

Maximum average output powers were achieved for a cavity length of 8 m. In this instance the laser threshold occurred at ~900 mW of incident pump. The average slope efficiency was ~50% with respect to launched pump corresponding to an estimated quantum slope efficiency ~75% indicating that despite the unusual design the fibre is still highly efficient. Laser output powers well in excess of 500 mW were achieved under Q-switched operation at full incident pump power (2.5 W). The maximum q-switched pulse energy for this fibre length was ~0.4 mJ, obtained at repetition rates below 500 Hz. The operating laser wavelength was 1558 nm, the minimum pulse duration was 40 ns giving a maximum pulse peak power of 10 kW.

Figure 6:
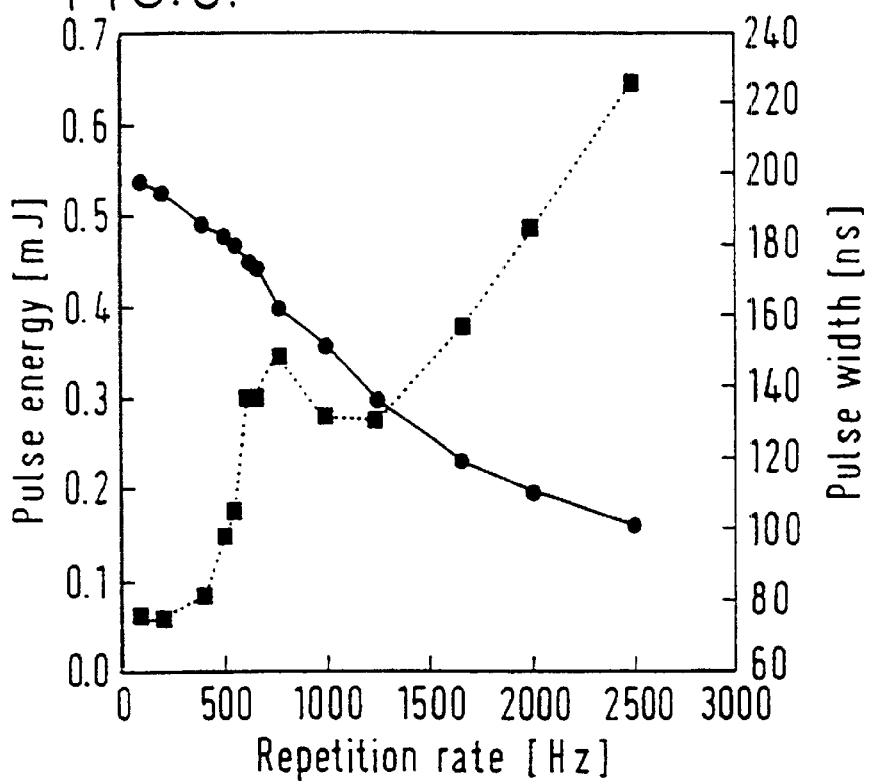
FIG. 6 is a graph of pulse energy and pulse width against pulse repetition rate.

The highest pulse energies were obtained for a fibre length of 12 m. In FIG. 6 the output pulse energy is plotted as a function of pulse repetition frequency for this length. It is seen that at repetition frequencies less than or equal to 200 Hz pulse energies in excess of 0.5 mJ are obtained. The pulse energies at low repetition rates were measured in three different ways to confirm the results obtained. Firstly, measurements were made of average power, and from a study of the temporal laser dynamics between pulses made a correction for (continuous wave) ASE emitted during the gain recovery stage. Secondly, average power measurements were used but the ASE correction was made based on time average spectral measurements of the laser output. Finally, direct pulse energy (pulse height) measurements were taken on a calibrated fast detector (requiring no ASE correction). All average power meters used were within calibration and were cross checked for consistency. For the highest pulse energy obtained, the average output power at 200 Hz was 134 mW, and the average ASE power emitted with the Q-switch turned off was 37 mW. The contribution of ASE to the total recorded signal power during Q-switching at 200 Hz was estimated at 31 mW using method 1 and 28 mW using method 2, yielding pulse energy estimates of 0.514 and 0.527 mJ for methods 1 and 2 respectively. The direct pulse energy measurements gave a value of ~0.52 mJ yielding an average value for our measurements of ~0.52 mJ.

FIG. 6 also illustrates the variation of pulse width with pulse repetition frequency. As expected, the pulse width decreases with reduced repetition rate and correspondingly increased energy. The hump in the curve indicates a distinct pulse shape change (formation of a distinct side-lobe) which occurs at a repetition frequency of ~800 Hz. The pulse width of the 0.52 mJ pulses was 70 ns. The corresponding peak power was thus ~7 kW. The spectral bandwidth of these pulses was ~10 nm although this reduced rapidly with increasing repetition rate (decreasing pulse energy). Bandwidths as narrow as 0.1 nm could be obtained for pulse energies as high as 0.250 mJ by incorporating a narrowband optical filter within the cavity.

The spatial mode of the laser output was characterized by beam scanning and beam quality ($M^2$) measurements. The $M^2$ measurements gave values of 1.1 and 1.2 for the two orthogonal, transverse spatial co-ordinates confirming the high quality, single mode nature of the beam.

Fibre MFD measurements were performed using a scanning knife-edge technique and the divergence of the laser output from the cleaved fibre end (lasing between two flat cleaves, 96% output couplers) was characterised.

Figure 7:
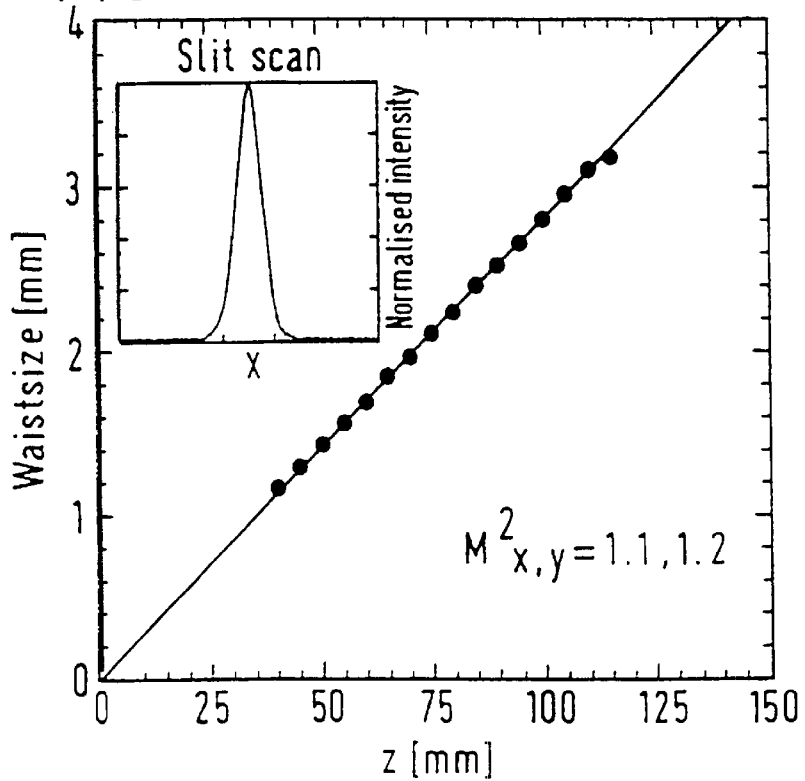
FIG. 7 is a graph illustrating beam properties.

These results are illustrated in FIG. 7, which shows the spot diameter versus distance z from the fibre end, with a best fit theoretical curve based on Gaussian beam propagation for a fibre MFD of 34 $\mu$m (main curve), and a plot of the measured spatial intensity profile (inset).

The mode area of the fibre is thus estimated at ~910 $\mu m^2$, approximately 20–30 times that of conventional erbium doped fibres, and around three times bigger than had previously been reported in a strictly single mode system.

Figure 8:
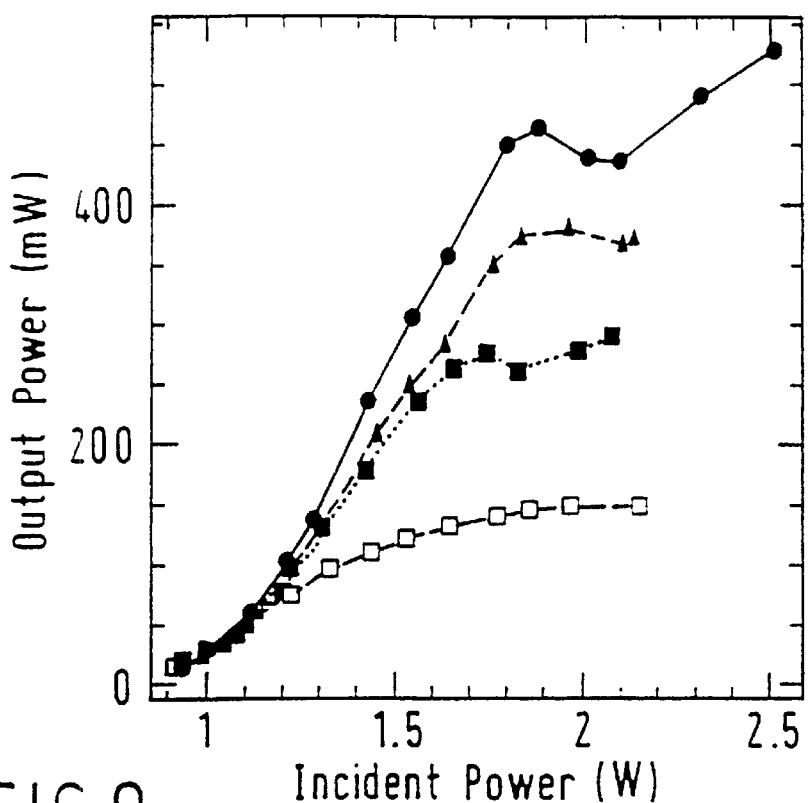
FIG. 8 is a graph of output power against pump power.

At the maximum output power fibre length of 8 m mentioned above, the output power of the laser against pump power was measured for a variety of pulse repetition rates, and the results are illustrated in FIG. 8. In FIG. 8, the various curves are:

solid circles—cw operation triangles—4 kHz pulse repetition solid squares—1 kHz pulse repetition hollow squares—400 Hz pulse repetition Further performance measurements were made on a second prototype embodiment having a 27 $\mu$m diameter core fibre, with a corresponding outer diameter of 300 $\mu$m.

Figure 9:
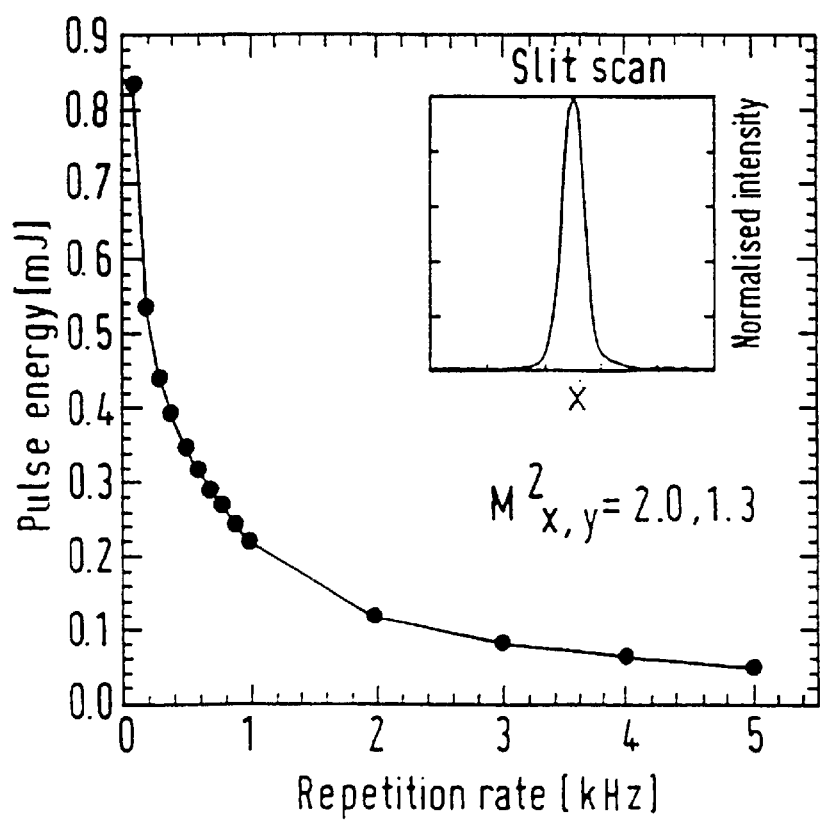
FIG. 9 is a graph illustrating beam properties.

Theoretically, this fibre was estimated to guide 3–4 core modes. Once again the cavity length was optimised empirically to 9 m for maximum pulse energy. In FIG. 9 (main curve), pulse energy is plotted as a function of repetition frequency for a fibre length of 9 m.

In this embodiment pulse energies as high as 0.83 mJ were obtained at repetition rates below 100 Hz (evaluated as previously described for the 21 $\mu$m core fibre). The duration of these pulses was 80 ns and their corresponding peak power ~10 kW. Spatial mode-profile measurements were made as described previously.

A plot of the scanned intensity mode profile is presented inset in FIG. 9, showing a reasonably Gaussian profile, although it should be noted the mode was observed to be fairly elliptic. This observation was confirmed by $M^2$ measurements which gave values of 2.0 and 1.3 respectively for the two ellipse axes. The mode quality is thus slightly degraded in this more highly multi-moded structure, presumably by mode-coupling.

Another benefit of this design of fibre is its relative immunity to bend loss. FIGS. 10 to 13 present some theoretical modelling of the fibre to demonstrate this.

Figure 10:
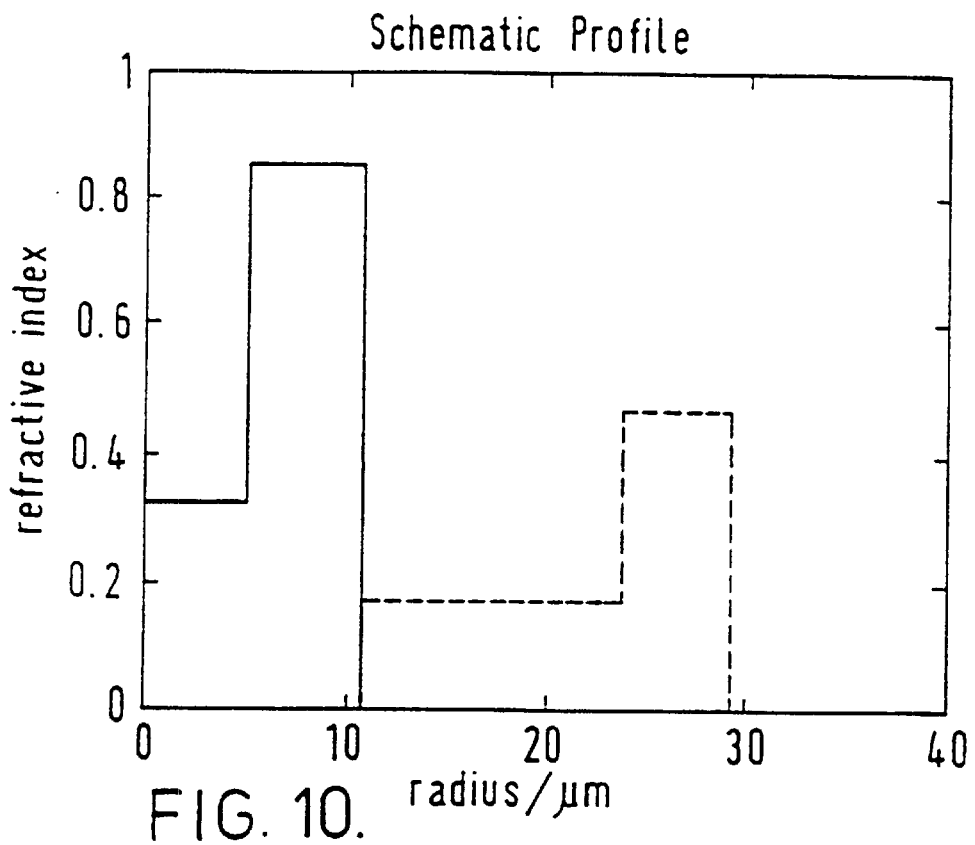
FIGS. 10 to 13 are schematic graphs illustrating the results of a computer modelling process applied to the fibre design.

In particular, FIG. 10 schematically illustrates two refractive index profiles used in the modelling process. In a first profile (solid line), a peaked core is employed but a cladding ring (27 in FIG. 2) is omitted. In the second profile, the ring (dotted line) is added to the core structure of the first profile. The shapes of the profiles used in the modelling process are angular and somewhat schematic, but they do represent the principles behind the structures.

Figure 12:
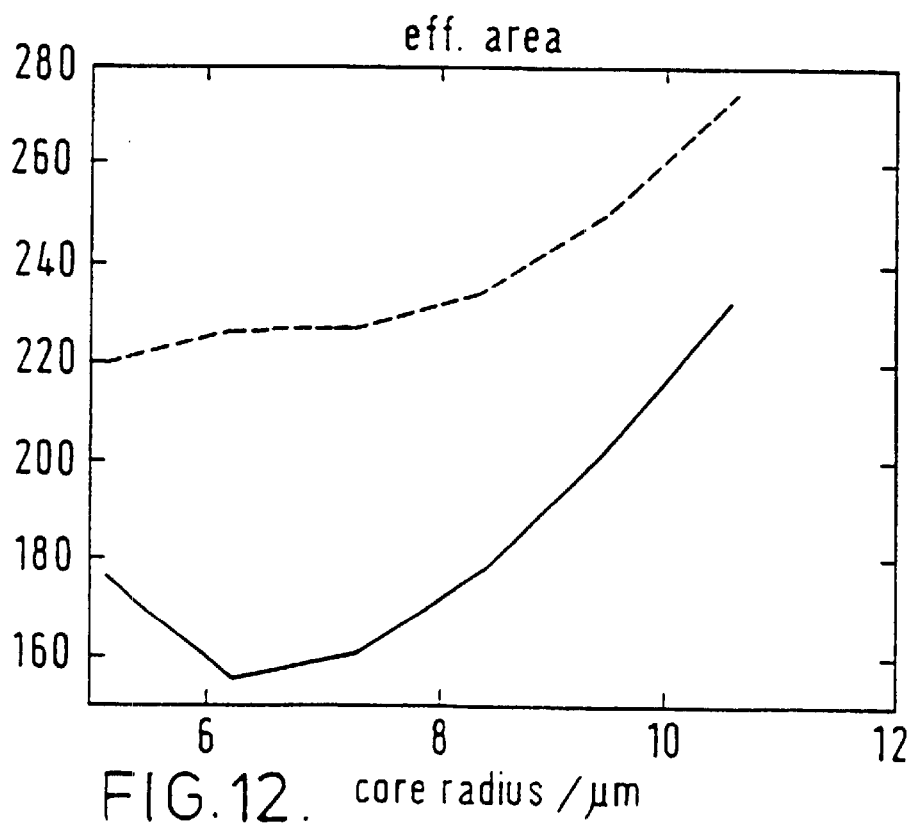
Figure 11:
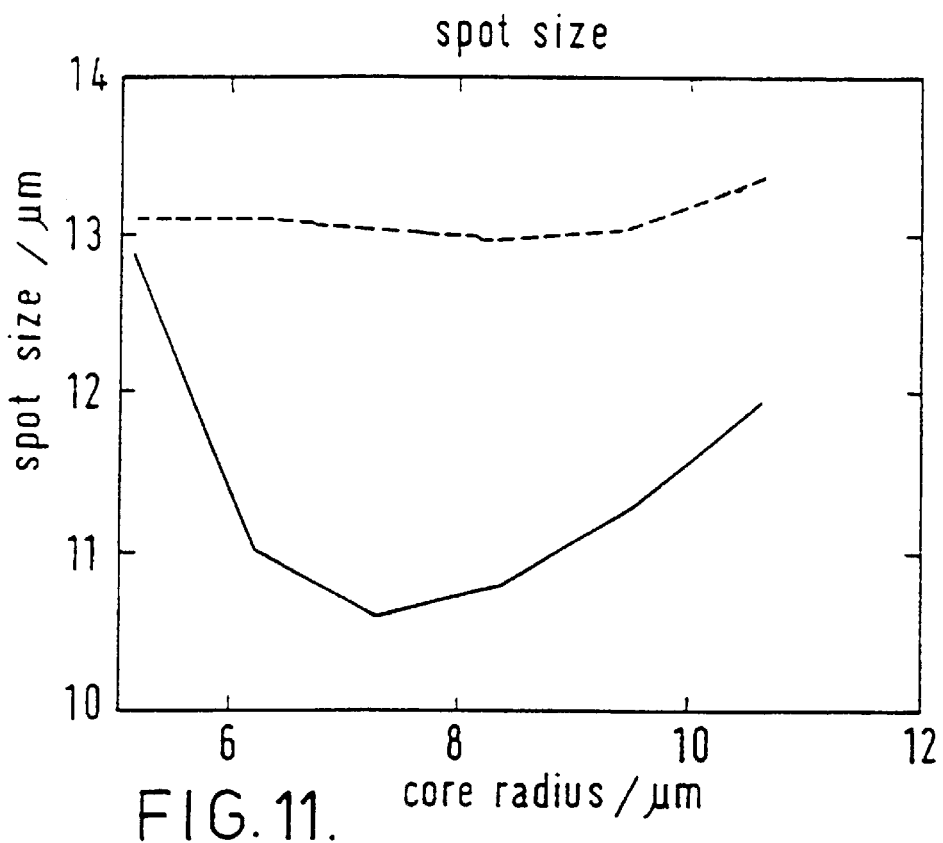
Figure 13:
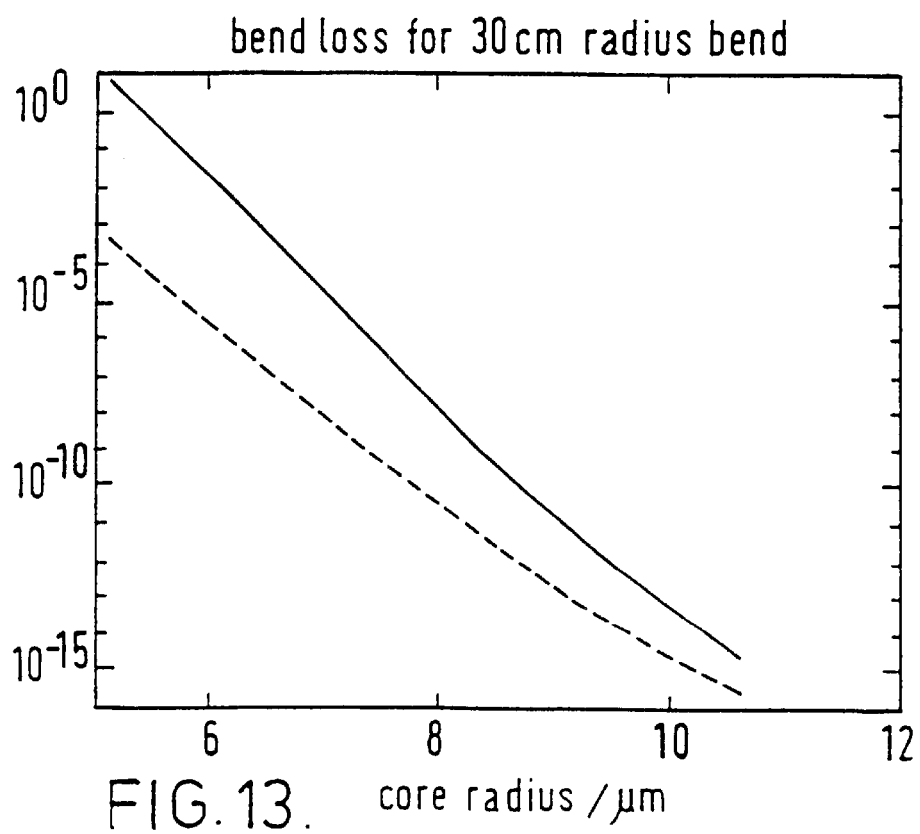

In FIGS. 11 to 13 various results derived from the computer model are illustrated, as solid lines (for the first structure) and dotted lines (for the structure including the cladding ring).

FIG. 11 illustrates spot size against core radius, and shows that the spot size is consistently higher with the cladding ring than without. The increase in spot size in the solid curve towards low radii represents an unstable mode, when the core in effect becomes too small to confine a stable mode.

FIG. 12 illustrates the mode's effective area against core radius, and again this is consistently higher for the cladding ring structure.

Finally, FIG. 13 illustrates bend loss against core radius for a 30 cm radius fibre bend. The bend loss performance is consistently better with the cladding ring than without.

In other embodiments, the fibres described above can be used in optical devices such as fibre gratings, e.g. including photosensitizing dopants such as germanium and/or boron. Such devices will also benefit from the large MFD and low mode coupling described above.

In embodiments of the invention, appropriately designed doped multimode fibres can be used to construct fibre lasers that provide robust single mode output, thus providing scope for extending the range of single mode output powers and energies achievable from fibre laser systems. Prototype embodiments can provide very high single mode pulse energies for an active fibre device obtaining >0.5 mJ output pulses ($M^2$<1.2) from a Q-switched fibre laser and even higher pulse energies (as high as 0.85 mJ) with slightly degraded spatial mode quality $M^2$<2.0. The pulse peak powers achieved ~10 kW we believe also to be a record for a Q-switch fibre laser system. The embodiments are also fully compatible with the cladding pumping concept [10] facilitating the development of higher average power (multi-10W), mJ systems.

A further prototype embodiment of a Q-switched, cladding-pumped, ytterbium-doped, large mode area (LMA) fibre laser will now be described with reference to FIGS. 14 to 18. The laser, operating at 1090 nm, has been found to be capable of generating a record-breaking 2.3 mJ of output pulse energy at 500 Hz repetition rate and over 5 W of average output power at higher repetition rates in a high-brightness beam ($M^2$=3). A similar fibre generated >0.5 mJ pulses in a diffraction-limited beam.

FIG. 14 depicts the experimental set-up used in this prototype embodiment. A 36 m Yb-doped fibre 100 was end-pumped by a 915 nm beam-shaped diode bar 110 [19] with a launch efficiency of about 60%. For Q-switching, an acousto-optic modulator (AOM) 120 was employed. A fibre end "B" was angle-polished to suppress feedback. Initially, a perpendicular fibre facet closed the cavity at the other end "A". The end was polished since it proved difficult to cleave the rectangular fibre with sufficient precision. The laser performance at low repetition rate was found to be rather dependent on the quality of this facet.

Other components of the experimental set-up include mirrors 130, lenses 140 and dichroic mirrors 150. One of the dichroic mirrors and one conventional mirror were arranged as an optional feedback unit 160, the effect of which will be described below.

As shown schematically in FIG. 16, the fibre 100 has a rectangular inner cladding 200 of substantially pure silica (175×350 $\mu$m) formed by milling the fibre preform, and a silicone rubber outer-cladding 210 providing an inner cladding NA of 0.4. An aluminosilicate LMA outer ring 220 is centred in the cladding. The outer ring 220 of raised index increases the mode area and reduces the bend loss of the fundamental mode. Yb is incorporated in the inner ring 230 (i.e. core) only. It has an NA of 0.075 and a diameter of 44 μm, offering a large saturation energy. The low NA LMA-design reduces the number of guided core-modes and further improves energy storage. Even so, the core supports about 20 modes at the operating wavelength of 1090 nm. The fibre was doped with 0.3% $Yb^{3+}$ by weight. The radial distribution of ytterbium creates preferential gain for the fundamental mode which ensures a good output beam quality. The use of a similar design in a core-pumped erbium-doped fibre source has been reported as obtaining 0.5 mJ output energy in a single transverse mode [20]. However, this approach has not been used in a cladding pumped geometry before, nor with Yb-doping. The arrangement shown in FIG. 16 can be cladding-pumped.

As mentioned above, two different out-coupling arrangements were used in the apparatus of FIG. 14, either simply a perpendicular polished fibre facet at the fibre end "A", or the arrangement 160 shown inside the dashed rectangle, with a slightly angled fibre end, a 5 nm-wide dichroic bandpass filter operating at 1035 nm, and a high reflectivity mirror.

At repetition rates below 2 kHz, it was found that ASE built up between the pulses and limited the pulse energy. The ASE at the fibre end "B" dominates the total ASE-losses, since it is seeded by reflections at the fibre end "A". By eliminating the reflection (using an angle-cleaved end at the fibre end "A") it was ensured that most of the ASE was emitted at end "A" at the shorter wavelength of 1035 nm [3]. This ASE was separated from the laser output with a narrowband filter and reflected back into the cavity, whilst keeping feedback around 1090 nm low. In other words, the dichroic mirror 150 in the feedback unit 160 diverts the laser output but allows the ASE emission to pass through and so be reflected back into the cavity by the HR mirror 130 in the feedback unit 160. This effectively "recycles" the ASE emission. This lowered the ASE losses by approximately 2.5W or 65%. A corresponding scheme has previously been used in erbium-doped fibre amplifiers [22]. Given that at 500 Hz repetition rate the filter reflected only about 78%, a better bandpass filter would allow the retrieval of most of the 2.3 mJ of output pulse energy available after the dichroic mirror. Realistic improvements in fibre design should also further improve the pulse energies and beam quality obtainable with this approach.

FIGS. 17 and 18 show the pulse energy dependence on repetition rate and pump power, with and without ASE. Pulse energies of 1.6 mJ at 1 kHz and 1 mJ at 5 kHz were reached, corresponding to an average power of 5W. The pulse duration ranged from 0.1 to several microseconds (decreasing with increased pulse energy), and exhibited peaks separated by the cavity round-trip time (0.36 μs). At high energies, a single peak shorter than 0.1 μs dominated the pulse. The output beam was of good spatial quality despite the multi-mode core ($M^2$=1.3).

In summary, for the highest pulse energies in this prototype embodiment, ASE at 1035 nm was "recycled". The experimental results represent a three-fold increase in pulse energy over previously published Q-switched fibre lasers, and firmly establish fibre lasers as compact, multi-watt, multi-millijoule pulse sources with large scope for scientific and industrial applications.

It will be appreciated that although fibre index profiles have been shown where the index dips in the centre part of the core, such a dip is not necessary. Indeed, for relatively larger fibres (e.g. a core size of the order of 100 μm) a flat-top or rounded index profile may be preferable as at high core diameters the lowest order mode can tend to follow the core index profile. So, a more flat-topped index profile can help to ensure that a first order fundamental mode is preferred. The core size can be much bigger than those described in detail—indeed, cores of well over 100 μm may be used. A greater core size, and in particular a greater ratio of core size to cladding size, tends to give a better overlap between pump light and the core. This can lead to shorter devices which are less prone to non-linearity and which can generate shorter pulses. This in turn can provide a device with a greater peak output power.

APPENDIX

Consider a hypothetical optical fibre refractive index profile as shown in FIG. 19 of the drawings. The profile is basically a top-hat shape, having a core of radius a and refractive index $n_2$ surrounded by a cladding of refractive index $n_1$. The derivation below, following "Optical Fibre Communications—Principles and Practice", J M Senior, Prentice Hall, 1992, defines a range of the radius a, in terms of $n_1$, $n_2$ and the wavelength in question, whereby the fibre is considered to be single-mode in operation.

Define:

$$\Delta = \frac{(n_2^2 - n_1^2)}{2n_1^2} = \frac{n_2 - n_1}{n_1}$$

Numerical Aperture, NA, is defined by:

$$NA = (n_2^2 - n_1^2)^{1/2} = n_1 \cdot (2\Delta)^{1/2}$$

Now v=normalised frequency, where:

$$v = \frac{2\pi}{\lambda} \cdot a \cdot n_1 (2\Delta)^{1/2}$$

A fibre is considered to be singe mode for v<2.405, that is to say:

$$a < \frac{2.405\lambda}{2\pi \cdot n_1 \cdot (2\Delta)^{1/2}}$$

EXAMPLE

For a fibre where:

$$\lambda = 1.55 \text{ μm}; n_1 - n_2 = 0.002; n_1 = 1.46$$

then:

$$\Delta = 1.37 \times 10^{-3}; \text{ and } NA = 0.0076$$

so the fibre is single mode for if the fibre radius is:

$$a < 7.8 \text{ μm}$$

Publication References

1. D J Richardson et at, Laser Focus World, September 1997, pp87–96.
2. R J Mears et al, Electron. Lett., 22, pp159–160 (1986)
3. F Seguin et al, Opt. Eng., 32(9), pp2036–2041 (1993)
4. A Chandonnet et al, Opt. Eng., 32, pp2031–2035 (1993)
5. G P Lees et al, Electron. Lett. 31, pp1836–1826 (1995)

6. J Nilsson et al, Opt. Lett., 18, pp2099–2101 (1993)
7. D Taverner et al, Opt. Lett., 22, pp378–380 (1997)
8. D J Richardson et al, Electron. Lett., 31, pp393–394 (1997)
9. R Olshansky, Appl. Opt., 14, 20 (1975)
10. M E Fermann, Opt. Lett., 23, pp52–54 (1998)
11. J D Minelly et al, Proc.of 21st European Conference on Optical Communication, (Brussels, 1995), pp917–920
12. P E Britton et al, Opt. Lett., 23 pp582–584 (1998)
13. D J Richardson et al, Elec. Lett., 33, 1955–1956 (1997)
14. H Sabert et al, J. Light. Tech., 12, 1360–1368 (1994)
15. M Romagnoli et al, J. Opt. Soc. Am. B, 12, 72–76 (1995)
16. K Tamura et al, Opt. Lett., vol. 19, no. 1, pp46–48 (January 1994)
17. V Cautaerts et al, Opt. Lett., vol. 22, no. 5, pp316–318 (1997)
18. P V Mamyshev et al, Opt. Lett., vol. 19, no. 24, pp2083–2085 (Dec. 15 1994)
19. A. Clarkson et al, Opt Lett, 21,375–377 (1996).
20. H. L. Offerhaus et al, Opt Lett, 23, 1683–1685, (1998).
21. R. Paschotta et al, IEEE J. Quantum Electron, 33, 1049–1056 (1997).
22. J. Nilsson et al, IEEE Photonics Technol. Lett 19, 1551–1553 (1998).

What is claimed is:

1. An optical fiber having a cladding layer surrounding a core,
the cladding layer comprising at least a first, relatively inner region, a third, relatively outer region, and a second region disposed between the first and third regions, the second region having a higher refractive index than the first and third regions; and
the peak difference in refractive index between the first cladding region and the core being less than about 0.0030.

2. A fiber according to claim 1, the fiber being a multi-mode fiber in which the core is capable of supporting at least two optical propagation modes at an operating wavelength.

3. A fiber according to claim 2, in which the core diameter is at least 20 μm.

4. A fiber according to claim 1, in which the peak difference in refractive index between the first cladding region and the core is less than about 0.0025.

5. A fiber according to claim 4, in which the peak difference in refractive index between the first cladding region and the core is less than about 0.0020.

6. A fiber according to claim 5, in which the peak difference in refractive index between the first cladding region and the core is less than about 0.0015.

7. A fiber according to claim 1, in which the first and second regions are adjacent in a radial fiber direction.

8. A fiber according to claim 7, in which the thickness of the first region in a radial fiber direction is between about 0.1 and about 2 times the radius of the core.

9. A fiber according to claim 7, in which the thickness of the first region in a radial fiber direction is between about 0.25 and about 1.5 times the radius of the core.

10. A fiber according to claim 7, in which the thickness of the first region in a radial fiber direction is between about 0.75 and about 1.25 times the radius of the core.

11. A fiber according to claim 7, in which the thickness of the first region in a radial fiber direction is substantially equal to the radius of the core.

12. A fiber according to claim 1, in which the refractive indices of the first and third regions are substantially identical.

13. A fiber according to claim 1, in which the refractive index difference between the second region and the first region is between about 0.1 and about 2 times the peak refractive index difference between the core and the first region.

14. A fiber according to claim 13, in which the refractive index difference between the second region and the first region is between about 0.2 and about 1 times the peak refractive index difference between the core and the first region.

15. A fiber according to claim 13, in which the refractive index difference between the second region and the first region is between about 0.4 and about 0.6 times the peak refractive index difference between the core and the first region.

16. A fiber according to claim 13, in which the refractive index difference between the second region and the first region is substantially 0.5 times the peak refractive index difference between the core and the first region.

17. A fiber according to claim 1, in which the second region is generally cylindrical.

18. A fiber according to claim 17, in which the thickness of the second region, in a radial fiber direction, is between about 0.1 and about 3 times the core radius.

19. A fiber according to claim 17, in which the thickness of the second region, in a radial fiber direction, is between about 0.5 and about 1.5 times the core radius.

20. A fiber according to claim 17, in which the thickness of the second region, in a radial fiber direction, is between about 0.75 and about 1.25 times the core radius.

21. A fiber according to claim 1, in which the numerical aperture of the fiber is less than about 0.1.

22. A fiber according to claim 1, in which at least a portion of the fiber is doped with at least one photosensitizing dopant.

23. A fiber according to claim 22, in which the at least one photosensitizing dopant includes germanium or boron.

24. A fiber according to claim 1, in which a central region of the core has a lower refractive index than a peripheral region of the core.

25. A fiber according to claim 24, in which the refractive index difference between the central core region and the first cladding region is between about 0 and about 0.95 times the refractive index difference between the peripheral core region and the first cladding region.

26. A fiber according to claim 24, in which the refractive index difference between the central core region and the first cladding region is between about 0.25 and about 0.75 times the refractive index difference between the peripheral core region and the first cladding region.

27. A fiber according to claim 24, in which the refractive index difference between the central core region and the first cladding region is about 0.5 times the refractive index difference between the peripheral core region and the first cladding region.

28. A fiber according to claim 1, in which at least a part of the core is doped with one or more amplifying dopants.

29. A fiber according to claim 28, in which the core is doped according to a dopant distribution substantially matching the field distribution of a desired optical propagation mode within the core.

30. A fiber according to claim 29, in which the core is doped substantially symmetrically about a longitudinal fiber axis.

31. A fiber according to claim 30, in which substantially all of the core is doped with the amplifying dopant and substantially all of the cladding is not doped with the amplifying dopant.

32. A fiber according to claim 28, in which the/an amplifying dopant is a rare earth dopant.

33. A fiber according to claim 32, in which the/an amplifying dopant is selected from the group consisting of erbium, ytterbium, thulium, holmium and neodymium.

34. A fiber according to claim 1, the outer diameter of the cladding layer being at least about 200 $\mu$m.

35. A fiber according to claim 1, in which the first region and the third region are generally cylindrical.

36. A fiber according to claim 1, in which the first region is generally cylindrical and the third region is rectangular in cross-section.

* * * * *